Patented Jan. 6, 1953

2,624,750

UNITED STATES PATENT OFFICE 2,624,750

PROCESS OF PRODUCING PHOSPHATE ESTER

Alphonse Pechukas, Akron, Ohio, assignor, by mesne assignments, to Columbia-Southern Chemical Corporation, Pittsburgh, Pa., a corporation of Delaware No Drawing. Application January 23, 1948, Serial No. 4,069

4 Claims. (Cl. 260—461)

This invention is concerned with the production of esters of alcohols, particularly primary and secondary alcohols.

It is known that various esters may be prepared by reaction of an acid halide with a primary or secondary alcohol. This reaction proceeds with the evolution of the desired ester and hydrogen halide.

In certain cases this method has been found objectionable since yields of the desired ester are undesirably low and formation of by-products is undesirably high. Frequently, it has been considered essential to conduct the reaction in the presence of hydrogen chloride acceptors, such as pyridine or sodium hydroxide.

The present invention provides a simple method whereby esters may be prepared by reaction of alcohols particularly primary and secondary alcohols in high yield, without the use of an hydrogen chloride acceptor such as pyridine and without excessive formation of by-products. In accordance with this invention it has been found that esters may be prepared in high yield, frequently higher than prior art processes, and in a simple and economic manner by reacting a primary or secondary alcohol with an acid halide, such as an acid chloride, in liquid phase and in the presence of a liquid solvent which is a solvent for the alcohol, acid chloride and ester of the alcohol and which essentially is a nonsolvent or poor solvent for the hydrogen chloride evolved during the reaction. In this process, the temperature of the reaction mixture is maintained at the boiling temperature whereby substantial distillation takes place, and sufficient of the nonsolvent is maintained present to ensure removal of HCl substantially as soon as formed and to reduce the solubility of HCl in the reaction mixture to a low value. As a consequence, hydrogen chloride which is evolved during the reaction is carried from the solution with the vaporizing nonsolvent. This vapor mixture passes through a suitable reflux condenser system for the purpose of condensing the nonsolvent and returning it to the reaction mixture. Because of insolubility of the HCl in the nonsolvent, only a minor quantity or substantially none of the HCl escaping from the reaction mixture is returned with the nonsolvent to the reaction mixture.

Chloride formation, previously encountered in a reaction of this character, is due, at least to a large degree, to reaction of evolved hydrogen chloride with the ester and/or the alcohol to form the corresponding organic chloride (RCl). I have found that HCl has substantial solubility in many liquid esters such as are produced by reaction of acid chlorides with alcohols. This factor promotes formation of chlorides, frequently to a serious degree.

By using a nonsolvent for HCl in the manner herein contemplated, the amount of HCl in the reaction mixture may be maintained low. This is particularly true when the reaction mixture is maintained at a temperature such that substantial distillation takes place. In such a case the solubility of the HCl remains at a substantial minimum and is removed substantially as soon as formed due to the distillation of the nonsolvent.

In general the process is initiated by introducing a quantity of the nonsolvent into a reactor equipped with a reflux condenser system. This condenser system has a suitable outlet to permit escape of HCl gas beyond the condenser. Heat is applied to the reactor to cause vaporization and reflux of the nonsolvent. Thereupon alcohol and acid chloride are added continuously or periodically in relative amounts required to react and to form the corresponding ester.

During the reaction, the temperature of the reaction mixture is maintained at a level at which substantial distillation of the nonsolvent occurs. The rate of such distillation should be sufficient to ensure removal of HCl substantially as fast as it is evolved.

The process is continued by adding reactants periodically or continuously and nonsolvent is returned or added to the mixture at a rate sufficient to replace that distilled off. If the process is conducted in a continuous manner, suitable means are provided for drawing off a quantity of the mixture during the operation.

Various solvents for the alcohol and the acid chloride which are nonsolvents for HCl may be used. Such "nonsolvents" are liquids in which the solubility of HCl at their boiling temperature is low, for example of the order of one percent by weight of HCl or below. In general nonoxygenated solvents having boiling points of 0 to 200° C. are suitable. Such solvents or "nonsolvents" should be substantially miscible with the ester being produced or at least have a relatively high solubility (for example 10 percent or more by weight) therein.

A particularly effective class of solvents which may be used as herein contemplated, are the hydrocarbon halides. Typical chlorinated hydrocarbons which have been found to be suitable are ethyl chloride, methylene chloride, chloroform, carbon tetrachloride, trichloro-propanes, monochlorobenzene, trichloroethylene, perchloroethylene, difluoro-dichloro-methane and ortho dichlorobenzene. A further class of nonsolvents which are suitable for this purpose include liquid hydrocarbons having the boiling points desired, such as heptane, hexane, cyclohexane, benzene, xylene, gasoline or toluene. The selection of any particular nonsolvent will depend, to some degree at least, upon the boiling point of the alcohol undergoing esterification and the solubility of the alcohol in the nonsolvent, as will be readily understood by those skilled in the art. Especially effective nonsolvents for the purpose herein contemplated are methylene chloride and carbon tetrachloride.

The nonsolvent used should have a boiling point below that of the alcohol or hydroxy compound which is being esterified. However, it is usually desirable for the nonsolvent to have a boiling point above room temperature, preferably above 50° C. and within 25 to 75° C. of the boiling point of the alcohol. For example, in reacting phenol with thionyl chloride, better yields are obtained using monochlorobenzene than with methylene chloride or carbon tetrachloride. The production of sulfites of the lower aliphatic alcohols containing up to 8 carbon atoms, is best accomplished using solvents which boil at about 50 to 125° C. and preferably having a boiling point within about 25° C. of the boiling point of the alcohol.

The amount of nonsolvent used should be sufficient to ensure appreciable distillation of solvent and to cause appreciable reflux thereof. No hard and fast rule may be laid down in this connection since it has been found that a wide variation in the ratio of solvent to alcohol-acid chloride mixture may be maintained so long as substantial reflux or at least distillation of the nonsolvent from the reaction mixture takes place. Usually the amount of nonsolvent present and the rate of vaporization thereof should be sufficient to establish a partial pressure due to nonsolvent vapors which is not less than about one-half of the partial pressure of the HCl vapor and preferably the nonsolvent vapor partial pressure should be at least 75 percent of atmospheric pressure. During the process, the concentration of the ester formed in the reaction mixture increases and frequently the solubility of HCl in the reaction mixture increases as the ester concentration increases. In general, the amount of nonsolvent in the reactor should not be less than 10 percent by volume of the volume of ester being prepared which is present. For most purposes the volume of nonsolvent should be 0.5 to 5 times the volume of ester present.

The results which are obtained with any particular concentration of nonsolvent for HCl depends to a large degree upon the rate of distillation of nonsolvent from the reaction mixture. For example, in one series of tests involving reaction of thionyl chloride with methanol in the presence of methylene chloride using 5 parts by volume of methylene chloride per volume of methyl sulfite it was found possible to raise the yield about 5 percent of theoretical by increasing the rate of distillation of the methylene chloride until the pressure due to the nonsolvent increased from about ½ atmosphere to about 75 to 90 percent of atmospheric pressure. Moreover five volumes of nonsolvent per volume of sulfite ester resulted in a yield about 5 to 10 percent greater than is obtained when but 0.5 volume of nonsolvent was used. To a substantial degree, a decreased nonsolvent to ester ratio can be compensated for by an increased rate of distillation and vice versa.

The invention contemplates reaction of various acid chlorides with various alcohols. For example, an alcohol, such as ethanol, may be reacted with thionyl chloride to form either sulfites or chlorosulfinates depending upon the ratio of alcohol to acid chloride used. Moreover alcohols may be reacted with other acid chlorides which contain the group

where X is carbon, sulphur or phosphorus. Such acid chlorides include phosphrous oxychloride; sulphuryl chloride; chloroformates such as methyl, ethyl, n-propyl, n-butyl, allyl, phenyl, crotyl, methallyl cinnamyl chloroformate or similar chloroformates of monohydroxy compounds, chloroformates of polyhydroxy alcohols such as ethylene glycol bis chloroformate, diethylene glycol bis chloroformate, triethylene glycol bis chloroformate tetraethylene glycol bis chloroformate and 2,3-carbonyldioxypropyl chloroformate; chlorosulfinates corresponding to the above chloroformates such as diethylene glycol bis chlorosulfinate; organic carboxylic acid chlorides such as acetyl chloride, fumaryl chloride, phthalyl chloride, propionyl chloride, butyryl chloride, or cinnamyl chloride. The invention also contemplates the production of esters from other acid chlorides wherein an acidic hydrogen or hydroxy is substituted by halogen as in the case of silicon tetrachloride, titanium tetrachloride and partial esters of such compounds.

The process is particularly concerned with the preparation of esters of monohydric alcohols which contain up to 8 carbon atoms. Thus, the invention has been found to be applicable to the production of esters of methyl alcohol, ethyl alcohol, n-propyl alcohol, isopropyl alcohol, n-butyl alcohol, isobutyl alcohol, isoamyl alcohol, octyl alcohol, cyclohexyl alcohol, methyl hexyl carbinol, benzyl alcohol, cinnamyl alcohol, Beta phenyl ethyl alcohol, 2-chloroethyl alcohol, 2-cyano ethyl alcohol, 1,2-dichloropropanol and the corresponding nitro- or bromo-alcohols or other similar monohydric aliphatic, cycloaliphatic or aryl alcohol. Esters of higher alcohols containing, for example up to 30 carbon atoms such as esters of stearyl alcohol, lauryl alcohol, nonyl alcohol, oleyl alcohol, blown sperm alcohols, etc. also may be prepared. Moreover the invention may be extended to the production of esters of other compounds which contain an hydroxyl group which is esterifiable with acids such as sulfite esters of phenol, cresol, esters of hydroxy acids such as ethyl lactate, ethyl salicylate, ethyl glycollate and similar esters. Esters of polyhydroxy compounds which contain two or more esterifiable hydroxyl groups such as ethylene glycol, propylene glycol, glycerol, hydroquinone, etc. also may be prepared according to this invention.

The proportion of acid chloride to alcohol desired is dependent upon the product desired. Frequently, the concentration of the alcohol and the acid chloride are present in substantially stoichiometric proportions or within about 20 mol per cent of such proportions. In most cases some excess of alcohol is used in order to ensure substantially complete reaction of alcohol with the acid chloride and this excess may be 5 to 150 percent over the theoretical amount required for complete reaction.

The process generally is performed by establishing a refluxing pool of the nonsolvent and adding portions of the alcohol and acid chloride, continuouosly or periodically to the pool. As the volume of the reaction mixture increases portions thereof may be withdrawn continuouosly or from time to time and the withdrawn mixture worked up to recover the ester.

The following examples are illustrative:

EXAMPLE I

The apparatus used consisted of a 3-liter reaction flask equipped with a mercury sealed agitator, thermometer, and a cold water reflux condenser which was provided with a Dry Ice-acetone-cooled cold finger on top of the condenser and an outlet beyond the condenser for the escape of evolved HCl from the condenser system. The flask was provided with a side arm which drained into a 2-liter 3-neck flask provided with a water cooled reflux condenser and a Dry Ice-acetone-cooled cold finger on top of the condenser. The side arm was so located as to maintain the quantity of reaction mixture in the first reaction flask at 1500 milliliters. The reactor flask was heated on a water bath and the second 3-neck flask was heated on a steam bath.

Alcohol, thionyl chloride and methylene chloride were fed into the reactor every two minutes, the methylene chloride being added first and the thionyl chloride last at a rate sufficient to supply reactants required to produce 1 and ½ mols of product (assuming theoretical yields) per hour and to maintain a ratio of 5 parts of solvent to 1 of product by volume. In this case reagent additions each two minutes were as follows:

22.3 milliliters of methylene chloride
4.06 milliliters of methanol
3.65 milliliters of thionyl chloride The process was continued until 6 mols of thionyl chloride and 12 mols of methanol had been added during which the average reaction temperature remained approximately from 36 to 39° C. and the cooling water supplied to the reflux condensers was approximately 20–25° C. During this period methylene chloride refluxed rapidly in the reflux condenser over the reaction flask and evolved HCl escaped through the reflux condenser from the system as rapidly as formed so that only a minor concentration of HCl was present in the reaction mixture. As reaction proceeded the flask filled up and overflowed through the side arm into the other flask which was maintained at the degassing temperature (approximately 43–44° C.). Upon fractionation of the product a total yield of 95.6% of dimethyl sulfite was obtained.

EXAMPLE II

Into a 5-liter 3-necked flask was placed 850 cubic centimeters of methylene chloride. The flask was fitted with a thermometer, glass stirrer, two dropping funnels and a water cooled condenser. The system was heated to the reflux temperature of methylene chloride (40° C.) and 900 grams of thionyl chloride and 1980 grams of 2-ethylhexyl alcohol was slowly added over a period of 3 hours. The rate of addition was such that at least two mols of alcohol per mol of thionyl chloride was added at all times. After addition has been completed, refluxing was continued until evolution of HCl ceased. The mixture was heated in vacuo to distill off the methylene chloride and the resulting dioctyl sulfite was obtained. This ester had an index of refraction $N_D^{26}$ of 1.4488. The yield of this ester was 91.6% of theoretical yield.

EXAMPLE III

A 5-liter flask containing 2980 cubic centimeters of methylene chloride was fitted with a bulb type water cooled reflux condenser, nickel stirrer and two dropping funnels. The flask and contents were warmed to the reflux temperature of methylene chloride (40° C.) and 595 grams of thionyl chloride and 1006 grams of ethylene chlorohydrin was slowly added over a period of 3 hours. The rates of addition were such that a small excess of ethylene chlorohydrin over the theoretical required for sulfite production was maintained. A rapid reflux was maintained and was continued until HCl evolution substantially ceased. Thereafter the methylene chloride was distilled off and 2-chloroethyl sulfite obtained in 91 percent of theoretical yield.

EXAMPLE IV

The process of Example III was repeated using 1000 cc. of methylene chloride, one mol of thionyl chloride and two mols of isopropyl alcohol, the time of addition being 8 hours. The reaction mixture was allowed to stand for two additional hours and then was blown with dry air until HCl was essentially completely removed. The methtylene chloride was distilled off and isopropyl sulfite in approximately 90 percent yield was obtained together with a small amount of diisopropyl ether.

The following tables describe the conditions of operation for production of sulfites using other alcohols and/or other solvents:

*n-Propyl alcohol with thionyl chloride*

| Solvent (° C.) | Total Reaction Time (Hrs.) | Reactants Alcohol | (Moles) $SOCl_2$ | Products (Moles) | | |
|---|---|---|---|---|---|---|
| | | | | $R_2SO_3$ | $ROSOCl$ | $RCl$ |
| ($CH_2Cl_2$) | 6.5 | 2 | 1 | 0.93 | 0.0 | 0.01 |
| ($CCl_4$) | 6 | 2 | 1 | 0.96 | 0.0 | 0.03 |
| Monochlorobenzene | 4 | 2 | 1 | 0.89 | 0.0 | 0.10 |
| Orthodichlorobenzene | 4 | 2 | 1 | 0.78 | 0.0 | 0.20 |

*Reaction of isopropyl alcohol with thionyl chloride*

| Temperature (° C.) | Total Reaction Time (Hrs.) | Reactants Alcohol | (Mols) $SOCl_2$ | Products | | | (Mols) Olefin | Ether |
|---|---|---|---|---|---|---|---|---|
| | | | | $R_2SO_3$ | $ROSOCl$ | $RCl$ | | |
| 130 Monochlorobenzene | 4 | 2 | 1 | 0.44 | 0.0 | 0.17 | 0.15 | 0.08 |
| 40 ($CH_2Cl_2$) | 8 | 2 | 1 | 0.90 | 0.0 | 0.09 | 0.0 | |
| 180 Orthodichlorobenzene | 4 | 2 | 1 | 0.26 | 0.0 | 0.35 | 0.20 | 0.07 |

EXAMPLE V 178.6 grams of thionyl chloride and 300 milliliters of methylene chloride was placed in a flask and the mixture was heated under a reflux condenser at reflux temperature so that a rapid reflux took place. During the heating, a solution of 39.9 grams of diethylene glycol in 150 milliliters of methylene chloride was added over a period of one hour the evolved HCl being carried off with the vaporizing solvent and thereby escaping from the system. After addition was complete refluxing was continued for 10 minutes and excess thionyl chloride and solvent were distilled off at 30° C. and 2 millimeters pressure. The product obtained is a chlorosulfinate of diethylene glycol containing diethylene glycol bis (chlorosulfinate) and linear polymers having chlorosulfinate groups.

EXAMPLE VI

Into a 3-necked flask was placed 100 grams of methylene chloride. The flask was fitted with a thermometer, glass stirrer, two dropping funnels and a water cooled condenser. The system was heated to the reflux temperature of methylene chloride (40° C.) and 60.7 grams (1.32 moles) of absolute ethanol, which is 10% in excess of the stoichiometric amount, and 51.4 grams (0.4 mole) of phosphorus oxychloride was simultaneously added over a period of 35 minutes. Evolution of HCl began about 25 minutes after the addition of the reactants was commenced and sufficient heat was applied to cause a rapid reflux. After the addition had been completed, refluxing was continued for 10 hours after which 5 grams of NaOH pellets was dissolved in the flask to neutralize any traces of HCl which might be present. The methylene chloride was distilled off under vacuum and the resulting triethyl phosphate recovered by distillation.

The above esters also may be prepared using the corresponding acid bromides in lieu of acid chlorides.

This application is a continuation in part of my copending application Serial No. 769,767, filed August 20, 1947, now Patent No. 2,553,721.

Although the present invention has been directed with particular reference to the specific details of certain embodiments thereof, it is not intended that such details shall be regarded as limitations upon the scope of the invention except insofar as included in the accompanying claims.

What I claim is:

1. A method of producing a phosphate ester by reaction of phosphorus oxychloride with an hydroxy compound which contains an hydroxy group esterifiable with acids, which comprises heating a body of a liquid which is a non-solvent for HCl but a solvent for the ester, the phosphorus oxychloride, and the hydroxy compound to cause substantial distillation thereof, adding during the distillation portions of the hydroxy compound and the phosphorus oxychloride in substantially stoichiometric proportions required to produce the ester, and adding sufficient non-solvent to the mixture to ensure substantially continuous distillation thereof during the reaction of the oxychloride with the hydroxy compound while maintaining the rate of vaporization of the solvent sufficiently high to establish a partial pressure due to solvent vapor not less than 75 per cent of atmospheric pressure.

2. A method of producing a phosphate ester by reaction of phosphorus oxychloride with an hydroxy compound which contains an hydroxy group esterifiable with acids, which comprises heating a body of a liquid which is a non-solvent for HCl but a solvent for the phosphate ester, the phosphorus oxychloride, and the hydroxy compound to cause substantial distillation thereof, adding the hydroxy compound and the phosphorus oxychloride to the distilling liquid whereby to cause reaction and produce the ester, and maintaining the concentration and rate of vaporization of said liquid sufficiently high to establish and maintain, during the addition of said hydroxy compound and phosphorus oxychloride, a partial pressure due to the vapor of said non-solvent, not less than 75 per cent of atmospheric pressure.

3. A method according to claim 2 wherein the non-solvent is a chlorinated, normally liquid hydrocarbon halide.

4. A method according to claim 2 wherein the non-solvent is a normally liquid hydrocarbon.

ALPHONSE PECHUKAS.

REFERENCES CITED

The following references are of record in the file of this patent:

UNITED STATES PATENTS

| Number | Name | Date |
|---|---|---|
| 1,766,720 | Nicolai | June 24, 1930 |
| 2,005,619 | Graves | June 18, 1935 |
| 2,177,757 | Vanderbilt | Oct. 31, 1939 |
| 2,309,829 | Davis et al. | Feb. 2, 1943 |
| 2,409,039 | Hardy et al. | Oct. 8, 1946 |
| 2,471,274 | Lingo | May 24, 1949 |
| 2,553,721 | Pechukas | May 22, 1951 |

FOREIGN PATENTS

| Number | Country | Date |
|---|---|---|
| 487,253 | Germany | Dec. 12, 1929 |

OTHER REFERENCES

Houben, "Die Methoden der Org. Chemie" (3rd. ed., pub. in U. S. 1943), vol. 2, pp. 665–666.